(12) United States Patent
Doshi et al.

(10) Patent No.: US 10,074,077 B2
(45) Date of Patent: *Sep. 11, 2018

(54) METHOD AND SYSTEM FOR STREAMLINING VOTING PROCESS

(71) Applicant: eBay Inc., San Jose, CA (US)

(72) Inventors: Hemal Doshi, San Jose, CA (US); Nausher Ahmed Cholavaram, San Jose, CA (US); Deval Dudhia, San Jose, CA (US); Om Prakash Kannusami, San Jose, CA (US); Balakrishna Shanka, Milpitas, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,805

(22) Filed: Mar. 27, 2017

(65) Prior Publication Data

US 2017/0255904 A1  Sep. 7, 2017

Related U.S. Application Data

(63) Continuation of application No. 13/185,747, filed on Jul. 19, 2011, now Pat. No. 9,607,288.

(51) Int. Cl.
| | |
|---|---|
| *G06F 21/24* | (2006.01) |
| *G06Q 10/10* | (2012.01) |
| *G06Q 50/00* | (2012.01) |
| *H04L 29/08* | (2006.01) |

(52) U.S. Cl.
CPC ............. *G06Q 10/10* (2013.01); *G06Q 50/01* (2013.01); *H04L 67/20* (2013.01)

(58) Field of Classification Search
CPC ......... H04L 67/20; G06Q 50/01; G06Q 10/10
USPC .......................................................... 726/28
See application file for complete search history.

(56) References Cited

U.S. PATENT DOCUMENTS

| | | | |
|---|---|---|---|
| 9,607,288 B2 * | 3/2017 | Doshi | .................... G06Q 10/10 |
| 2010/0257030 A1 | 10/2010 | Crocker | |
| 2011/0225024 A1 | 9/2011 | Seyer | |
| 2011/0252325 A1 | 10/2011 | Kernan | |
| 2013/0024946 A1 | 1/2013 | Doshi et al. | |

OTHER PUBLICATIONS

"U.S. Appl. No. 13/185,747, Advisory Action dated Feb. 3, 2014", 3 pgs.

(Continued)

*Primary Examiner* — Baotran N To
(74) *Attorney, Agent, or Firm* — Schwegman Lundberg & Woessner, P.A.

(57) ABSTRACT

A method and system for streamlining a voting process performed by a web application is provided. As the web application may require that a voting action is effectuated after the user is registered to vote and also has supplied valid credentials, a voting application may be configured to intercept a request from a user to effectuate voting process directed to the web application, access credentials of the user stored by the web-based social networking application, and provide these credentials to the web application, such that the web application can process the request to effectuate voting process by registering the user to vote and storing the vote information for the user.

20 Claims, 6 Drawing Sheets

(56) References Cited

OTHER PUBLICATIONS

"U.S. Appl. No. 13/185,747, Appeal Brief filed Mar. 17, 2014", 21 pgs.
"U.S. Appl. No. 13/185,747, Appeal Decision mailed Sep. 9, 2016", 7 pgs.
"U.S. Appl. No. 13/185,747, Final Office Action dated Oct. 15, 2013", 11 pgs.
"U.S. Appl. No. 13/185,747, Non Final Office Action dated Jun. 7, 2013", 12 pgs.
"U.S. Appl. No. 13/185,747, Notice of Allowance dated Nov. 25, 2016", 5 pgs.
"U.S. Appl. No. 13/185,747, Response filed Jan. 15, 2014 to Final Office Action dated Oct. 15, 2013", 11 pgs.
"U.S. Appl. No. 13/185,747, Response filed Aug. 28, 2013 to Non Final Office Action dated Jun. 7, 2013", 10 pgs.
U.S. Appl. No. 13/185,747, U.S. Pat. No. 9,607,288, filed Jul. 19, 2011, Method and System for Streamlining Voting Process.

* cited by examiner

METHOD AND SYSTEM FOR STREAMLINING VOTING PROCESS

CLAIM OF PRIORITY

This application is a continuation of and claims the benefit of priority to U.S. application Ser. No. 13/185,747, filed Jul. 19, 2011, which is hereby incorporated by reference in its entirety.

TECHNICAL FIELD

This application relates to the technical fields of software and/or hardware technology and, in one example embodiment, to system and method for streamlining voting process.

BACKGROUND

A web-based social networking application may provide means for executing other web application within its context without leaving a web site provided by the web-based social networking application. For example, a web-based social networking application may provide a so-called canvas, within which a web application may be executing.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Computer-implemented method and system for streamlining voting process provided by a web application is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

A web application executing in the context of a web-based social networking application may be configured to present one or more web pages containing various information. The web application may be a social awareness application, such as, e.g., "Changemakers"® provided by Ashoka. The web-based social networking application may be "Facebook" provided by Facebook, Inc. A web-based social networking application may provide a so-called canvas page, on which to run a web application provided by a third party provider. A web application may be provided on a cloud-based computing platform. While two distinct entities may be providing, respectively, a web application and a web-based social networking application, a third entity may be providing a voting application (also termed a voting platform) that uses the canvas provided by the web-based social networking application to permit user interaction with the web application without requiring a user to leave the social networking web site.

Method and system are described for providing enhanced user experience to users who access a web application that is executing in the context of a web-based social networking application and who attempt to exercise the voting functionality of the web application. The web application, e.g., "Changemakers"® may serve, to a browser application executing on a client computer system controlled by a user, a web page that includes a visual control termed "a vote button." A vote button may be configured to detect a click associated with the vote button and cause the web application to update the voting data for an item associated with the vote button. In order to process a voting action (or merely a vote) submitted by a user, the web application may require a user to submit valid credentials first. The web application may then perform operations for registering the user to vote, and only after confirming that the user has been registered to vote within the web application, accept and process voting process by the user. In one example embodiment, a voting application provides functionality that streamlines the voting process performed by the web application. As the web application may require that a voting action is effectuated after the user is registered to vote and also has supplied valid credentials, the voting application may be configured to intercept a request from a user to effectuate voting process directed to the web application, access credentials of the user stored by the web-based social networking application, and provide these credentials to the web application, such that the web application can process the request to effectuate voting process by registering the user to vote and storing the vote information for the user. In some embodiments, the credentials of the user stored by the web-based social networking application are distinct from credentials of the user stored by the web application. A notification of the successful vote by the user may be propagated to a news feed of the user provided by the web-based social networking application.

Figure 1:
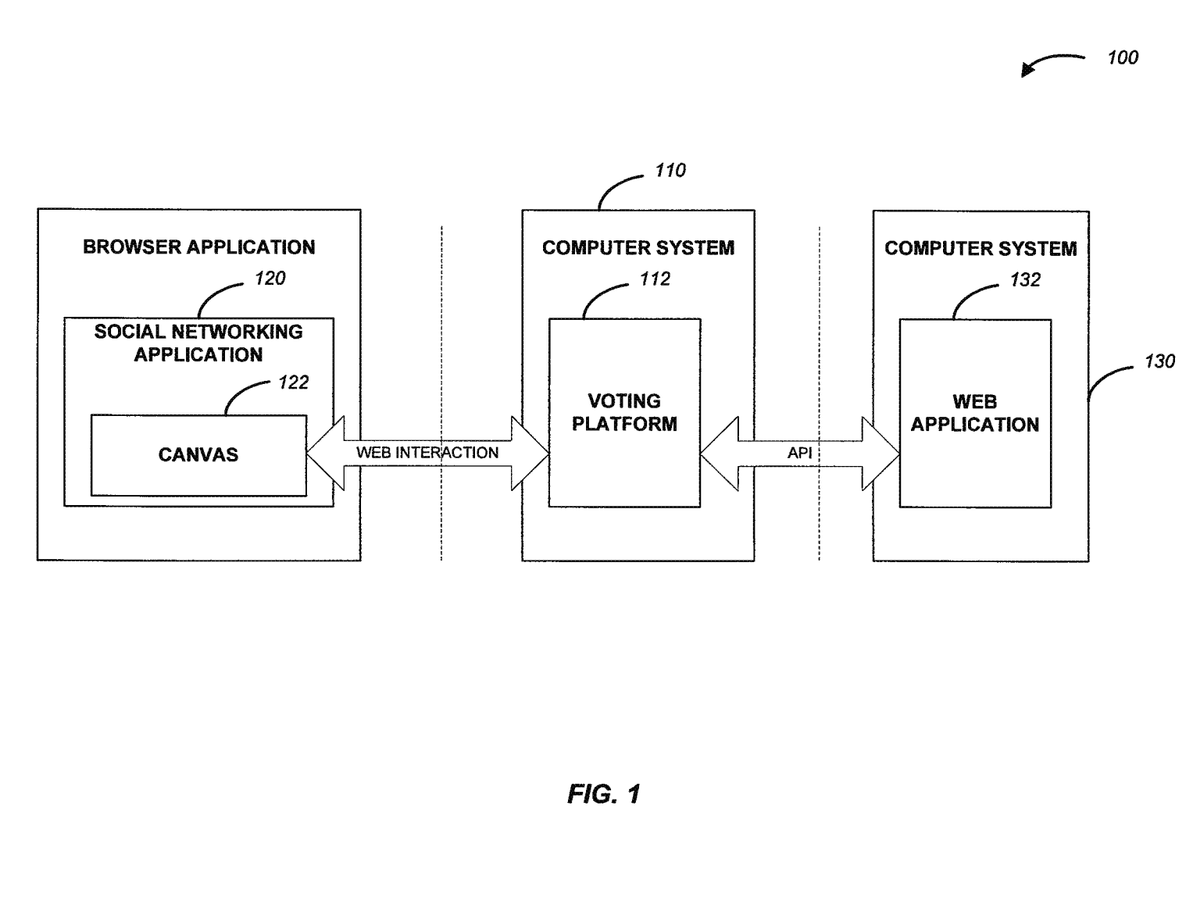
FIG. 1 is a diagrammatic representation of a computer architecture for streamlining a voting process provided by a web application, in accordance with one example embodiment.

An example computer architecture 100 for streamlining a voting process performed by a web application may be described with reference to FIG. 1. As shown in FIG. 1, a computer system 110 hosts a voting platform 112. The voting platform 112 uses a canvas 122 provided by the web-based social networking application 120 to permit user interaction with a web application 132 executing on a computer system 130 without leaving the social networking web site associated with the web application 132. The web-based social networking application 120 may be executing in a browser application and receive. In one embodiment, the voting platform 112 exchanges information with the canvas 122 via web-based interaction. The web application 132 exchanges information with the voting platform 112 via one or more application programming interfaces (APIs). An example method and system for streamlining a voting process performed by a web application may be implemented in the context of a network environment 200 illustrated in FIG. 2.

Figure 2:
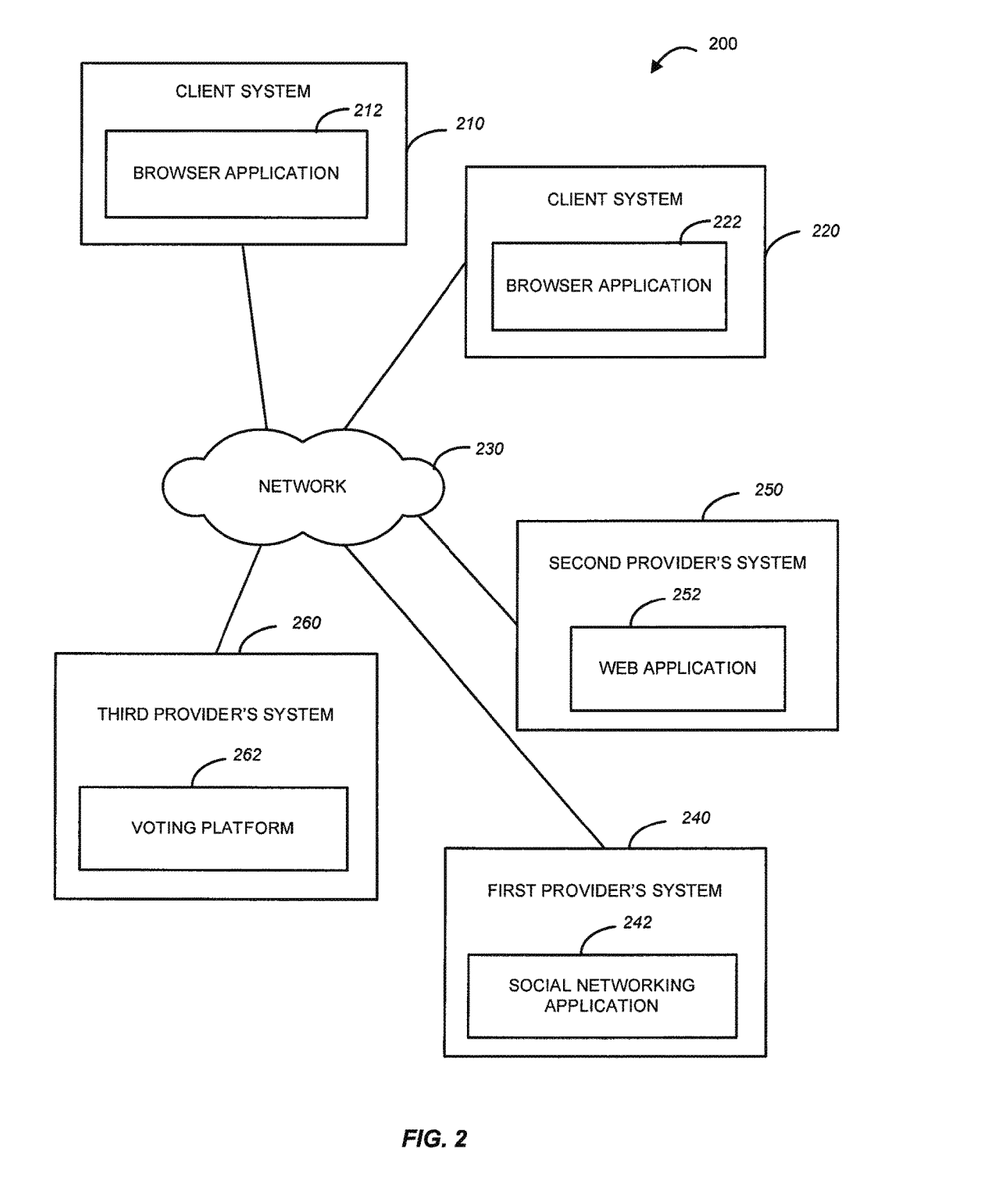
FIG. 2 is a diagrammatic representation of a network environment within which an example method and system for streamlining a voting process provided by a web application may be implemented.

As shown in FIG. 2, the network environment 200 may include client systems 110 and 120 and a first provider's computer system 240. The first provider's computer system 240, in one example embodiment, may host a social networking application 242, such as, e.g., Facebook®. The client systems 110 and 120 may run respective browser applications 212 and 222 and may have access to the first provider's computer system 240 via a communications network 230. The communications network 230 may be a public network (e.g., the Internet, a wireless network, etc.) or a private network (e.g., a local area network (LAN), a wide area network (WAN), Intranet, etc.).

Also shown in FIG. 2 are a second provider's computer system 250 hosting a web application 252 (e.g., Changemaker®) and a third provider's computer system 260 hosting a voting platform 262. As mentioned above, the voting platform 262 may be configured to provide functionality that streamlines the voting process performed by the web application 252 while it is being accessed via a web page provided by the social networking application 242. In one embodiment, the voting platform 262 may be configured to intercept a request from a user to effectuate voting process directed to the web application 252, access credentials of the user stored by the social networking application 242, and provide these credentials to the web application 252, such that the web application 252 can process the request to effectuate voting process by registering the user to vote and storing the vote information for the user. The third provider's computer system 260 hosting a voting platform 262 may be termed as intermediary provide system, as it may be utilized as an intermediary between the first provider's computer system 240 the second provider's computer system 250. Some example modules of the voting platform 262 are illustrated in FIG. 3.

Figure 3:
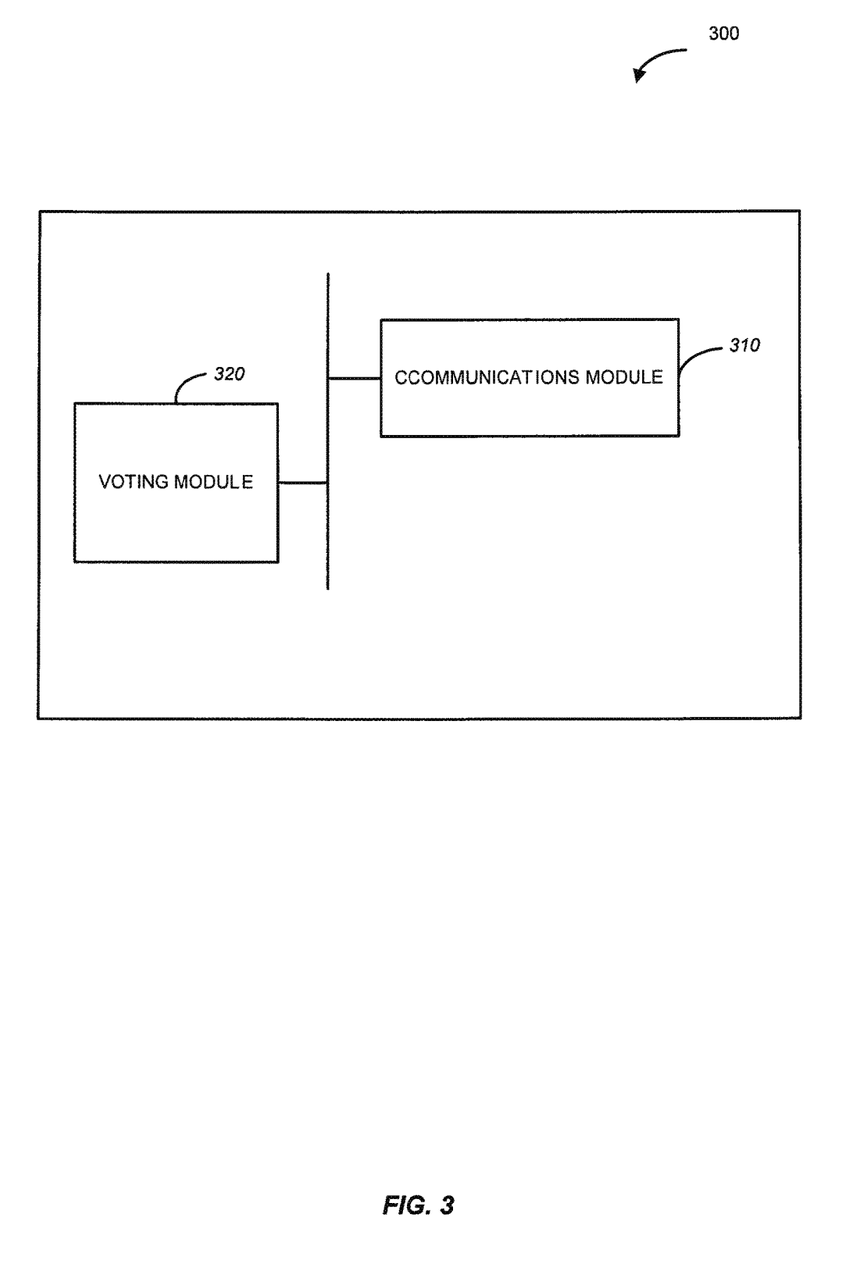
FIG. 3 is block diagram of a system for streamlining a voting process provided by a web application, in accordance with one example embodiment.

FIG. 3 is a block diagram of a system 300 for streamlining a voting process provided by a web application, in accordance with one example embodiment. As shown in FIG. 3, the system 300 includes a communications module 310 and a voting module 320. The communications module 310 may be configured to receive a request from a user to effectuate a vote action in a web application that is executing in the context of a web-based social networking application. The voting module 320 may be configured to perform the following actions in response to the request to effectuate a vote action: access credentials of the user stored by the web-based social networking application, provide the credentials of the user to the web application, and receive, from the web application, a notification of a successful vote by the user. The voting module 320 may be configured to provide, to the user, a notification of the successful registration to vote.

Figure 4:
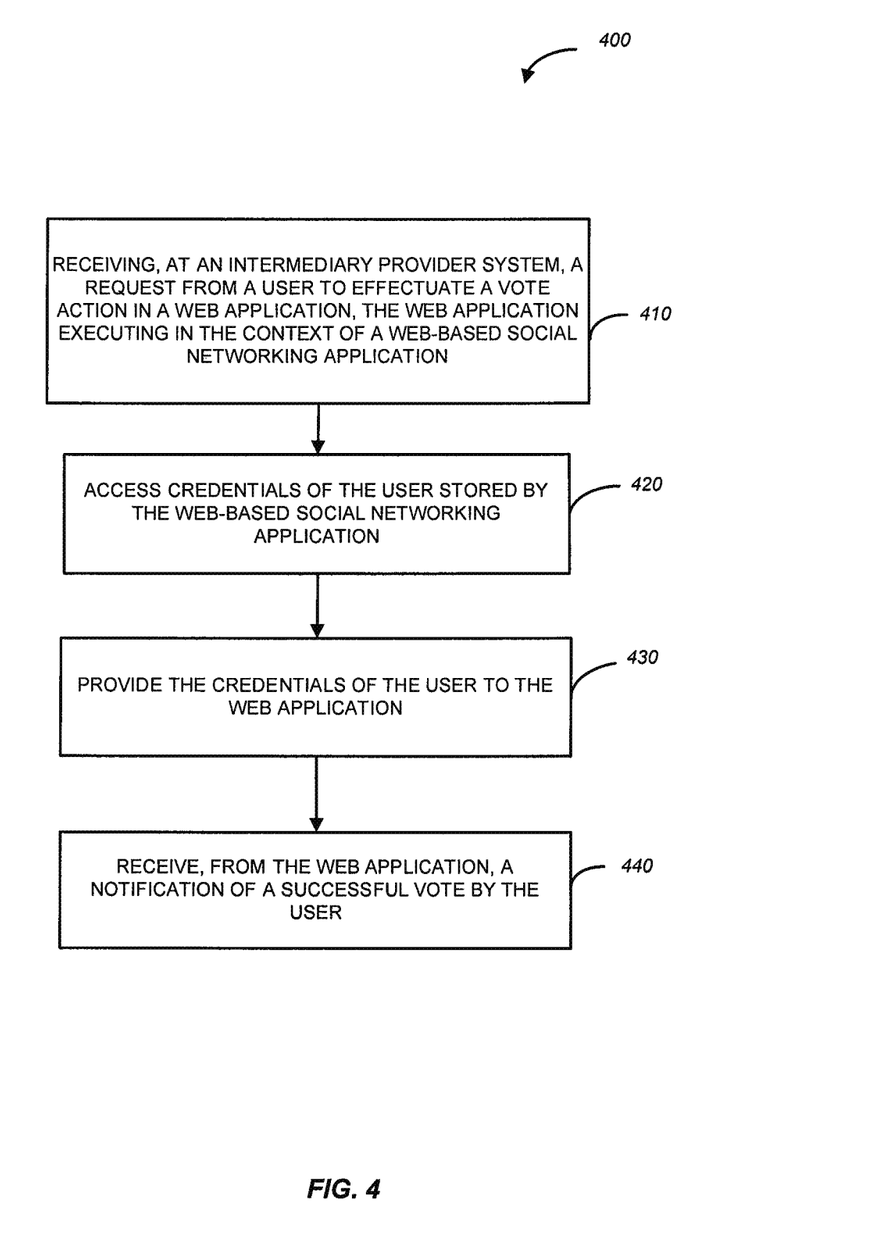
FIG. 4 is a flow chart of a method for streamlining a voting process provided by a web application, in accordance with an example embodiment.

FIG. 4 is a flow chart of a method 400 for streamlining a voting process provided by a web application, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the third provider's system 260 of FIG. 1 and, specifically, at the system 300 shown in FIG. 3.

As shown in FIG. 4, the method 400 commences at operation 410, when the communications module 310 of FIG. 3 receives a request from a user to effectuate a vote action in a web application, the web application executing in the context of a web-based social networking application. At operation 320, the voting module 320 of FIG. 3 accesses credentials of the user stored by the web-based social networking application. At operation 330, the voting module 320 provides the credentials of the user to the web application, and receives, from the web application, a notification of a successful vote by the user at operation 330.

Figure 5:
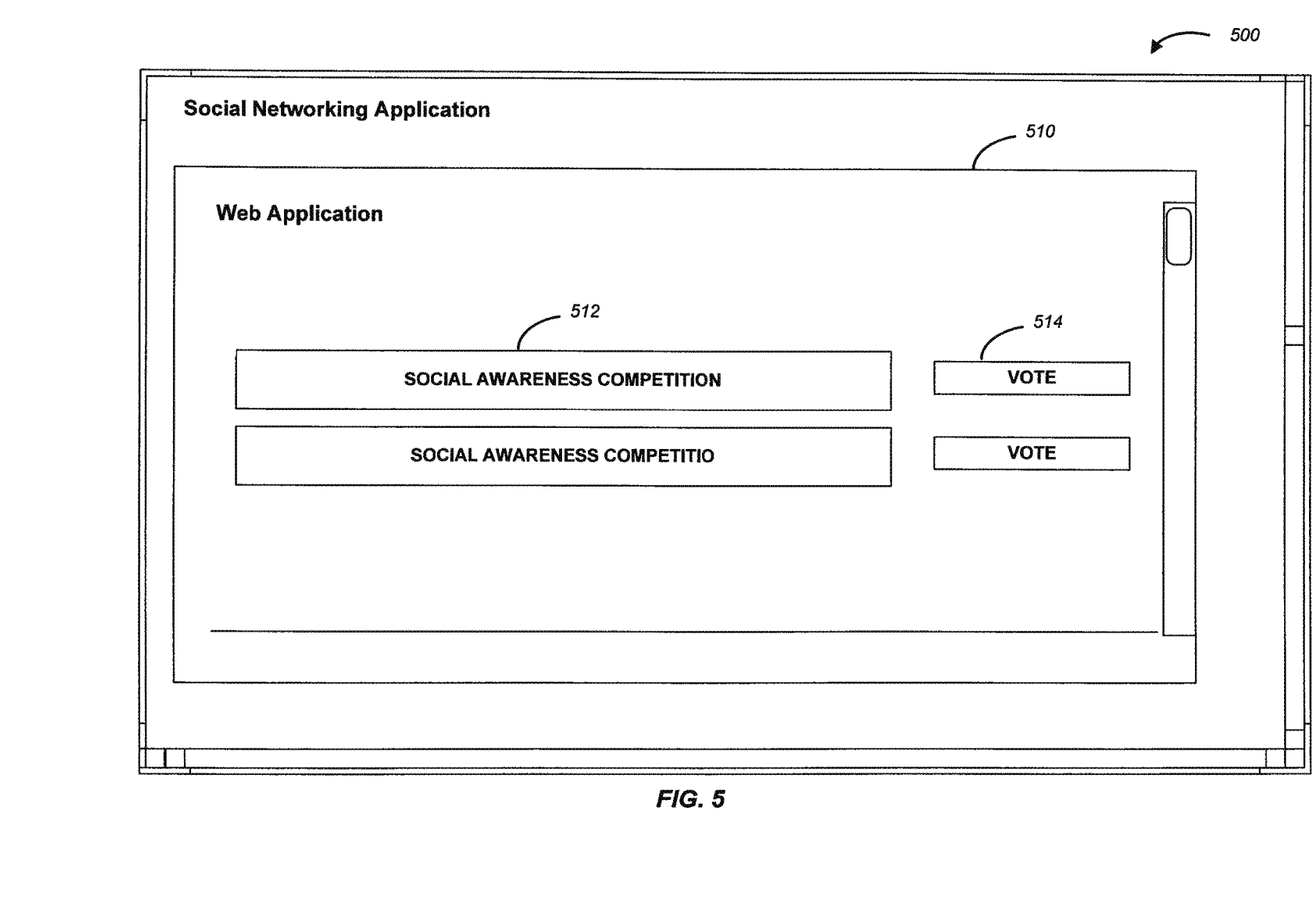
FIG. 5 is an example user interface illustrating a web application executing in the context of a web-based social networking application, in accordance with an example embodiment.

FIG. 5 is an example user interface (UT) 500 illustrating a web application 510 executing in the context of a social networking application. In one embodiment, the web application 510 provides information about web-based social awareness competitions (e.g., a social awareness competition 512) and permits a user to vote for the social awareness competition 512 using a voting button 514.

Figure 6:
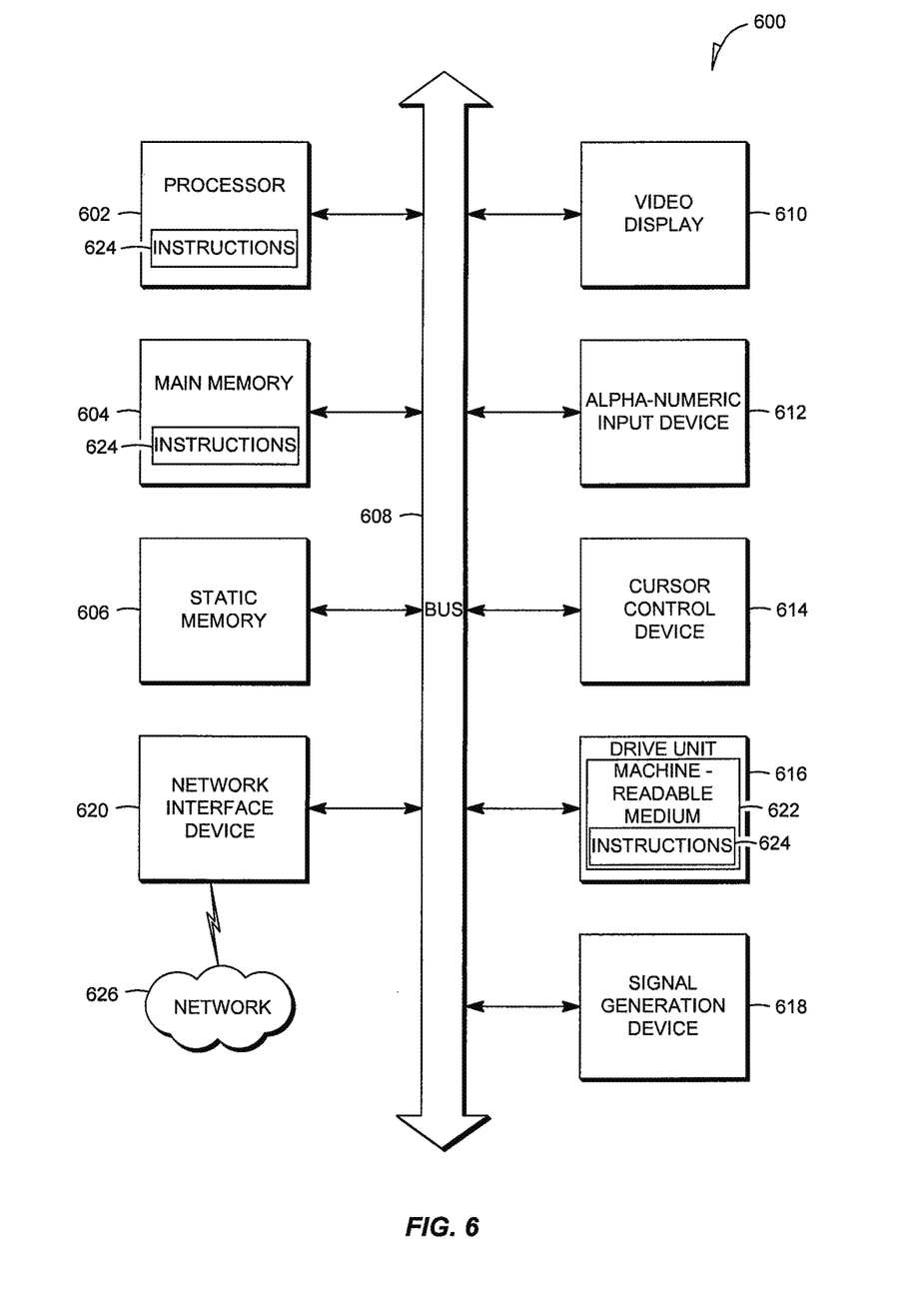
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 606. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system for streamlining a voting process performed by a web application has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
receiving, at an intermediary provider computer system executing a voting application, a request from a user to effectuate a vote action in a first web application, the first web application executing in the context of a second web application; and
in response to the request, at the intermediary provider system:
accessing credentials of the user stored by the second web application,
providing the credentials of the user to the first web application, and
receiving, from the first web application, a notification of a successful vote by the user.

2. The method of claim 1, wherein the receiving of the request to effectuate a vote action in the first web application is via a canvas provided by a second web application.

3. The method of claim 1, wherein the receiving of the notification of the successful vote by the user comprises receiving a notification of a successful registration to vote for the user at the first web application.

4. The method of claim 1, wherein the providing of the credentials of the user to the first web application comprises obtaining permission from the user.

5. The method of claim 1, wherein a computer system hosting the second web application is controlled by a first provider, a computer system hosting the first web application is controlled by a second provider, and the intermediary provider system is controlled by a third provider.

6. The method of claim 1, wherein the first web application is provided on a cloud-based computing platform.

7. The method of claim 1, wherein the request to effectuate a vote action in the first web application executing in the context of the second web application is associated with a vote button provided by the first web application.

8. The method of claim 1, wherein credentials of the user stored by the second web application are distinct from credentials of the user stored by the first web application.

9. The method of claim 1, wherein the request to effectuate a vote action is associated with a web-based competition.

10. The method of claim 1, comprising propagating the notification of the successful vote by the user to a news feed of the user, the news feed comprising a web page provided by the second web application.

11. A computer-implemented system comprising:
a communications module to receive, at an intermediary provider system, a request from a user to effectuate a vote action in a first web application, the first web application executing in the context of a second web application; and
a voting module to perform the following actions in response to the request to effectuate a vote action:
obtain credentials of the user by accessing the credentials of the user stored by the second web application,
provide the credentials of the user to the first web application, and
receive, from the first web application, a notification of a successful vote by the user.

12. The method of claim 11, wherein the receiving of the request to effectuate a vote action in the first web application is via a canvas provided by a second web application.

13. The method of claim 11, wherein the receiving of the notification of the successful vote by the user comprises receiving a notification of a successful registration to vote for the user at the first web application.

14. The method of claim 11, wherein the providing of the credentials of the user to the first web application comprises obtaining permission from the user.

15. The method of claim 11, wherein a computer system hosting the second web application is controlled by a first provider, a computer system hosting the first web application is controlled by a second provider, and the intermediary provider system is controlled by a third provider.

16. The method of claim 11, wherein the first web application is provided on a cloud-based computing platform.

17. The method of claim 11, wherein the request to effectuate a vote action in the first web application executing in the context of the second web application is associated with a vote button provided by the first web application.

18. The method of claim 11, wherein credentials of the user stored by the second web application are distinct from credentials of the user stored by the first web application.

19. The method of claim 11, wherein the request to effectuate a vote action is associated with a web-based competition.

20. A machine-readable non-transitory storage medium having instruction data to cause a machine to:
   receive, at an intermediary provider system, a request from a user to effectuate a vote action in a first web application, the first web application executing in the context of a second web application; and
   in response to the request to effectuate a vote action:
      obtain credentials of the user by accessing the credentials of the user stored by the second web application,
      provide the credentials of the user to the first web application, and
      receive, from the first web application, a notification of a successful vote by the user.

* * * * *